Aug. 5, 1924.

W. O. KENNINGTON 1,504,123

IGNITION CONTROLLER

Original Filed Jan. 7, 1915  2 Sheets-Sheet 1

Witnesses:
Franklin P. McDermott Jr.
J. M. Smith

Inventor:
William O. Kennington

Aug. 5, 1924.
W. O. KENNINGTON
1,504,123
IGNITION CONTROLLER
Original Filed Jan. 7, 1915    2 Sheets-Sheet 2
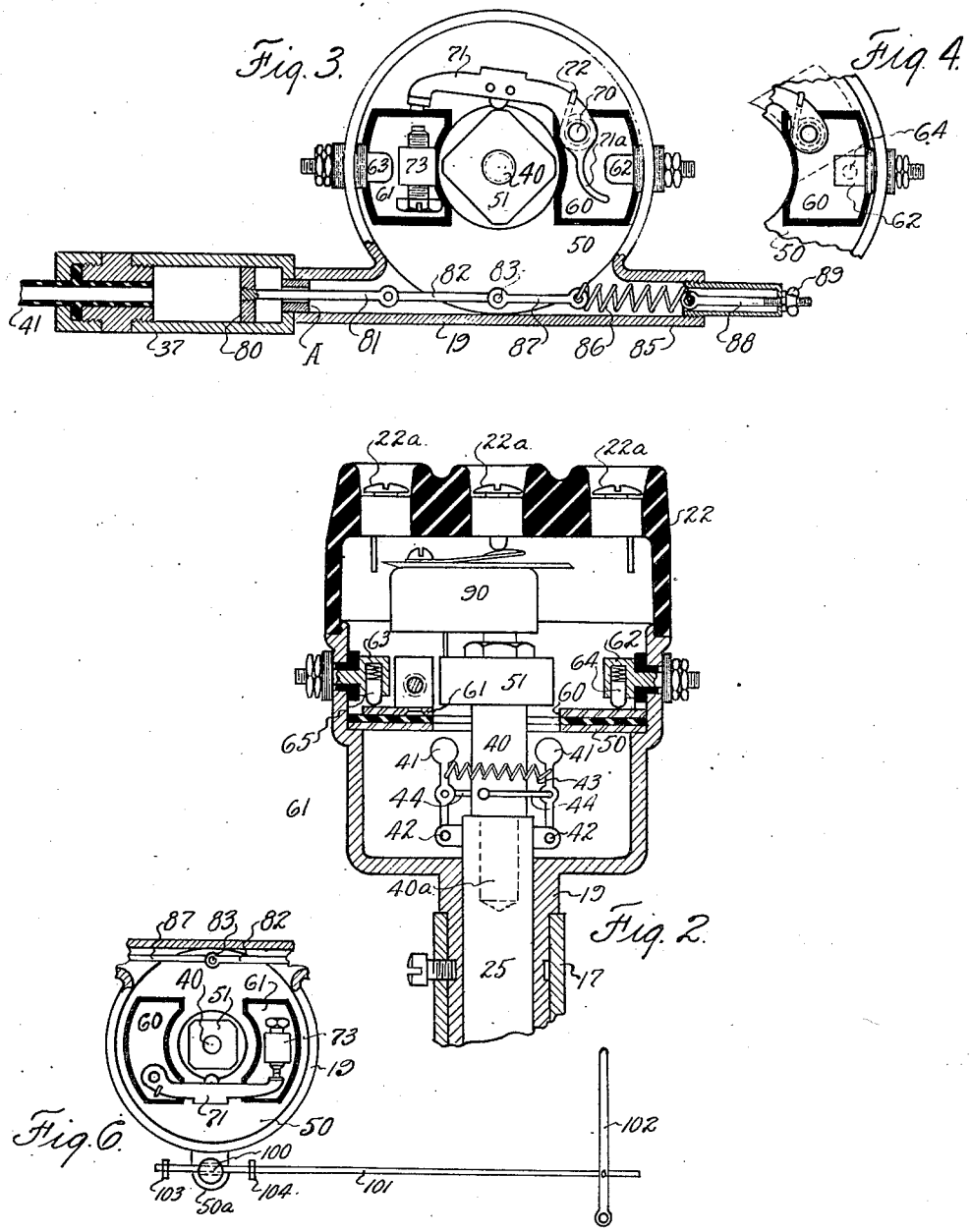

Patented Aug. 5, 1924.

1,504,123

UNITED STATES PATENT OFFICE.

WILLIAM O. KENNINGTON, OF ANDERSON, INDIANA, ASSIGNOR TO REMY ELECTRIC COMPANY, OF ANDERSON, INDIANA.

IGNITION CONTROLLER.

Application filed January 7, 1915, Serial No. 285,835. Renewed March 28, 1919.

*To all whom it may concern:*

Be it known that I, WILLIAM O. KENNINGTON, a subject of the King of England, and a resident of Anderson, in the county of Madison and State of Indiana, have invented a new and useful Ignition Controller, of which the following is a specification.

My invention relates to automatic means for controlling the ignition of internal combustion engines, and differs from the means ordinarily used in that the ignition is controlled by the quantity of mixture which is supplied to the cylinders.

According to the conditions under which the engine is operated, this may form the sole control of the ignition, or it may be supplemented by one or more other methods of control, such as manual control, or a control dependent on the speed of the engine.

Automatic mechanisms for advancing the ignition as the speed of the engine increases are well known, but these do not always give correct results because the timing is governed by the speed alone, regardless of the load on the engine, or the amount of combustible mixture supplied thereto. Practice shows that when the engine is operating with a light load, so that but little combustible mixture is admitted to the cylinders, the spark should be advanced more than when the engine is operating at the same speed but under a heavy load and with a correspondingly large quantity of mixture admitted to the cylinders. To overcome this objection of the older mechanisms, I employ a mechanism for advancing and retarding the ignition in accordance with some difference in pressure which occurs during the running of the engine, and which varies with the amount of mixture which is supplied to the cylinders. This difference in pressure is preferably the vacuum occurring in the intake pipe, which, for a given speed, is greater the less the throttle is opened. I preferably use, at least with variable speed engines, also one of the well known mechanisms for advancing the spark with increasing speed, said mechanism being operated, preferably, by centrifugal force. The total amount which the spark is advanced is thus due to the advance given by the speed actuated mechanism plus that given by the vacuum responsive means connected with the intake pipe.

Another application of my invention provides an automatic means for opening the ignition circuit when the engine is at rest, so that the ignition battery will not be uselessly exhausted, even though the circuit is not opened by a manually operated switch.

Referring to the drawings:

Fig. 2 is a central vertical section of my controller.

Fig. 3 is a view from the top of the controller, the distributor parts being removed, and a part being shown in section.

Fig. 4 is a modified form of the mechanism for opening the ignition circuit when the engine is at rest.

Fig. 6 shows a modified means for supplementing the automatic control with manual control.

The controller shown and described is for counter clockwise rotation of the driving shaft thereof, as viewed from the top. The changes necessary to adapt it to the opposite rotation are not described, since they will be evident to anyone skilled in the art.

Figure 1:
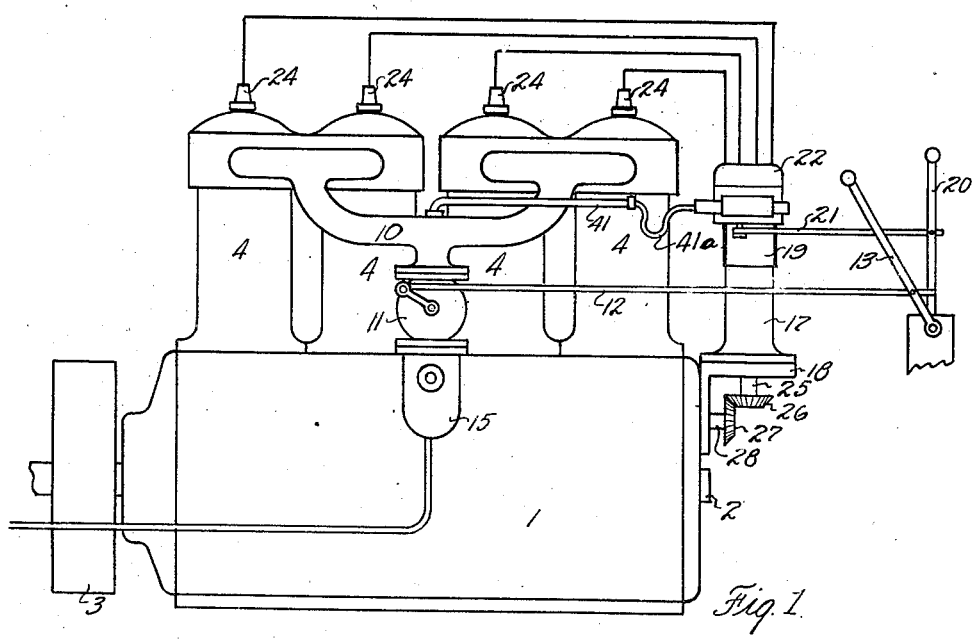
Fig. 1 shows an internal combustion engine with my invention applied thereto.

Referring to Fig. 1, there is shown an internal combustion engine, having the crank case 1, crankshaft 2, flywheel 3 and cylinders 4, 4, 4, 4, 10 is the intake pipe, connecting the cylinders to the throttle valve 11. There is shown a rod 12, connecting the manually operated lever 13 to said throttle. 15 is the carburetor, connected to the lower part of the throttle valve. The aforesaid parts are similar to those ordinarily used.

17 is the base of the ignition controller. It is rigidly secured to some part of the engine, such as the bracket 18. 19 is the controller casing which, in certain forms of the invention, may rotate, to a limited extent at least, in the base 17. For causing such rotation there is shown a manually operated lever 20, connected to the controller casing 19 by a rod 21. The upper part of the controller is here the distributor casing 22, having terminals which are wired to the spark plugs 24, 24, 24, 24 in the well known manner. 25 is the driving shaft of the controller, and is shown as actuated by bevel gears 26 and 27, connected respectively to said shaft 25 and to a shaft 28 of the engine.

Rigidly secured to the controller casing 19 is the vacuum chamber 37. This chamber is connected to the intake pipe by a tube 41. Said tube is here shown as having a flexible portion 41$^a$, permitting motion of the casing 19.

Referring to Fig. 2 there is shown in greater detail the controller casing 19 in the base 17. The driving shaft 25 is connected through a centrifugal mechanism to the timer shaft 40, said shaft 25 and 40 being here held in alinement by an extension 40$^a$ of the shaft 40 which fits into an opening in the shaft 25. The aforesaid centrifugal mechanism may be one of the well known means for advancing the timer shaft 40 relative to the driving shaft 25 as the speed of the engine increases. It is here shown conventionally as having weighted governor arms 41, 41, pivoted on the driving shaft at 42, 42 and pulled together by a spring 43. Each of these arms is connected by a link 44 to a pivot on the timer shaft 40, so that as the arms fly out, with increasing speed, they advance the shaft 40 relative to the shaft 25 in the well known manner. In this case, "advancing" is moving the timer shaft 40 counter clockwise (as seen from above) relative to the shaft 25.

Referring to Figs. 2 and 3, there are shown the essential parts of a timer or interrupter, which is of the conventional form, except for the hereinafter mentioned extension which may be used on the timer lever. Said timer includes the cam 51, rigidly secured to the timer shaft 40. There is a timer plate 50, rotatably mounted in the casing 19. Rigidly secured to said plate, but insulated therefrom are two plates 60 and 61, which are electrically connected to the respective terminals 62 and 63 in the casing 19. Said connection is here shown as produced by spring actuated plungers 64 and 65 respectively. The shaft 40 and cam 51 I term the revoluble member of the timer, and the plate 50 and attached parts, the adjustable member.

Pivoted at 70 to the plate 60 is the timer lever 71. A to and fro motion is imparted to this lever in the usual way by the spring 72 and cam 51, so that the circuit between the terminals 62 and 63 is alternately opened and broken by making and breaking contact between the lever 71 and a contact point 73, secured to the aforesaid plate 61.

The vacuum chamber 37 which is secured to the casing 19, contains a piston 80. The piston rod 81 is rigidly secured to said piston, and is also pivoted to the connecting rod 82. The other end of said connecting rod 82 is connected to a pin 83, which is secured to the timer plate 50. Thus, movement of the piston is accompanied by rotation of the timer plate 50. There is a spring housing 85 in line with the vacuum chamber 37, but on the opposite side of the casing 19. This housing contains a retractile spring 86, connected by a link 87 to the aforesaid pin 83 in the timer plate 50. The other end of the spring is connected to a threaded rod 88, which projects through the end of the spring housing 85, and is provided with nuts 89 whereby the spring tension may be adjusted.

The spring 86 tends to move the plate 50 so as to retard the ignition, in this case counter clockwise. A vacuum in the intake pipe of the engine, communicated to the vacuum chamber 37 through the tube 41, tends to move the piston 80 to the left, so as to move the plate 50 clockwise and advance the spark, and the amount that said plate is moved clockwise will depend on the vacuum in the intake pipe. The piston rod 81 preferably has a fairly tight fit at A where it passes through the vacuum chamber 37 so that the piston and the right hand end of said vacuum chamber co-operate to form a dash pot for preventing too rapid movement or violent oscillation of the timer plate 50.

In the form shown there is an extension 71$^a$ on the end of the lever 71, so that when the timer plate 50 has moved as far as possible in a counterclockwise direction, the said extension 71$^a$ will abut the terminal 62 and keep the lever 71 out of engagement with the contact 73. Thus when there is no vacuum in the chamber 37, the circuit between the terminals 62 and 63 is interrupted, regardless of the position of the cam 51.

In Fig. 4 is shown means for accomplishing this without the extension on the timer lever. The location of the plate 60 relative to the terminal 62 is such that when the timer plate 50 has moved as far as possible in a counterclockwise direction, its position is that indicated by the dotted lines. The contact between the plunger 64 (shown as a dotted circle) in the terminal 62 and the plate 60 is thus broken, and the circuit interrupted at this point.

As typical of present practice, I show a distributor having a casing 22 of insulating material, provided with suitable contacts 22$^a$, etc., which co-operate with the revolving distributor member 90 in the well known manner. Said revolving member 90 is suitably secured to the timer shaft 40 so as to rotate therewith.

Figure 5:
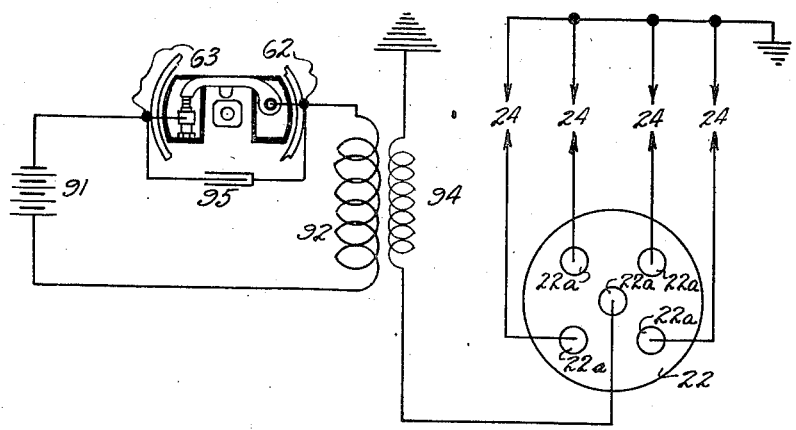
Fig. 5 shows a form of circuit that may be employed.

The particular form of circuits employed is not a feature of my invention, and I show in Fig. 5 the ordinary form of battery jump spark circuit as an example of one that may be employed. A battery 91 is connected in series with the primary winding 92 of an induction coil and with the timer mechanism of my controller. The connection to the timer mechanism is made to the terminals 62 and 63, and there is a condenser 93 in parallel with the timer. The secondary winding 84 of the induction coil has one terminal grounded, and the remaining terminal connected through the distributor to the various spark plugs 24 in succession. No switch is shown for opening the ignition circuit, as one of the features that may be included in my invention, if desired, provides a means for doing this.

The operation is as follows: When the engine is at rest the battery circuit is interrupted since the timer plate is moved as far as possible in the counter clockwise direction. As the engine is turned over for starting, the vacuum thereby produced in the intake pipe rotates the timer plate 50 clockwise, so that the circuit is periodically opened and closed by the action of the cam 51, and the sparks produced in the cylinders. After the engine has started running, the spark is advanced in accordance with the speed of operation by the centrifugal device, and this advance is supplemented by an additional advance due to the rotation of the plate 50 by the vacuum in the intake pipe.

Thus, for a given speed, the spark is advanced to a greater degree when there is a high vacuum in the intake pipe, than when this vacuum is low. But for a given speed, there is a greater vacuum in the intake pipe when the throttle is nearly closed and but little mixture supplied to the cylinders than when it is wide open. Consequently, when the throttle is but slightly open, the spark is automatically advanced more than when it is running at the same speed, but open to a greater degree, which is in accordance with the requirements determined by practice and set forth earlier in this description.

Under certain special conditions it may be desirable to supplement the automatic control of the ignition by a manual control. Such a case, for example, would be when, owing to defective carburetor adjustment, the speed of burning of the mixture differed materially from that ordinarily occurring with the same speed of operation and the same amount of mixture admitted to the cylinders. Such adjustment is shown as obtained by rotating the casing 19 by means of the lever 20, whereby, with unchanged relative position of the adjustable timer member to said casing, said adjustable member is rotated about the shaft 40 so as to advance or retard the spark as in the case of non-automatic ignition timers.

Fig. 6 shows another method of supplementing the automatic control by manual control. The plate 50 has an extension 50ª passing through a slot in the casing 19. There is a stud or eye 100 in said extension, through which passes a rod 101, which is free to slide therein. A manually operated lever 102 attached to one end of the rod 101 provides a means for actuating said rod. There are two collars 103 and 104 rigidly secured to said rod, on opposite sides of the eye 100. When it is desired to use the automatic controller without supplementing or limiting its action by the manual controller, the lever 102 is placed in a position similar to that shown in the drawing, so that the plate 50 can move to the limit of its motion in either direction without the abutment of the eye 100 against either of the collars 103 or 104. If the lever 102 be moved to the left, the abutment of the collar 104 against the eye 100 will limit the amount that the plate 50 can move counter clockwise, and this may be used to prevent the ignition from becoming inoperative when there is no vacuum present. Further motion of said lever to the left will advance the spark. Movement of the lever 102 to the right will cause abutment of the collar 103 and the eye 100, and will limit the amount that the spark can be advanced. Sufficient motion of the lever to the right will hold the plate 50 in such a position as to render the ignition inoperative, and this may be used for stopping the engine. With this arrangement, it is unnecessary that the casing 19 rotate in the base 17, and the tube 41 does not require a flexible portion.

I am aware that automatic means for timing the ignition by producing a spark when the compression in the cylinder has reached a predetermined amount are known. Such devices would produce earlier ignition as the quantity of mixture supplied, and therefore the compression, is increased. Instead of giving the results which I seek, such devices therefore would produce the opposite result.

I claim as my invention:

1. An ignition controller, including the combination with an internal combustion engine, of ignition timing means timer controlling means actuated by the vacuum in the intake pipe of said engine, second timer controlling means actuated by the speed of said engine and cooperating with said vacuum actuated means, and a manually operated timer controlling means.

2. An ignition controller including the combination with an internal combustion engine, of ignition timing means timer controlling means actuated by a difference in pressure which is dependent on the amount of mixture which is supplied to said engine, whereby the ignition is advanced as the amount of said mixture is decreased, a second timer controlling means controlled by the speed of said engine, and a manually operated timer controlling means.

3. An ignition controller including the combination with an internal combustion engine, of a timer having an adjustable member, a means actuated by a difference in pressure which is dependent on the amount of mixture supplied to said engine for controlling the position of said adjustable member, whereby the ignition is advanced as the amount of said mixture is decreased, and a damping means for preventing a rapid movement of said adjustable member.

4. An ignition controller including the combination with an internal combustion engine, of an ignition timer having a lever, a contact engageable by said lever, a cam driven by said engine for causing periodic disengagement of said lever and said contact, a rotatable plate carrying said lever and said contact, a means for permanently separating said lever and said contact when said plate occupies certain positions, regardless of the position of said cam, and a means actuated by a difference in pressure which occurs during the running of the engine, for adjusting the position of said plate.

5. An ignition controller, including the combination with an internal combustion engine, of ignition timing means dependent upon the quantity of fuel mixture supplied to said engine, and automatic means for rendering said ignition timing means inoperative.

6. An ignition controller for an internal combustion engine, comprising a timer having an adjustable member, a vacuum responsive means connected to the intake of said engine and to said adjustable member to move the latter in one direction, a yieldable member connected to said adjustable member to move the same in the opposite direction, and a damping means for preventing rapid movement of said adjustable member.

7. An ignition controller including the combination with an internal combustion engine and ignition means for said engine, of means actuated by the vacuum produced by said engine for varying the time of ignition as the vacuum is varied and means for automatically rendering said ignition means inoperative.

8. An ignition controller including the combination with an internal combustion engine and ignition means for said engine, of means actuated by a difference in pressure, which is dependent on the amount of mixture supplied to said engine, for controlling the timing of the ignition means, and automatic means for rendering the ignition means inoperative when substantially no mixture is supplied to said engine.

9. An ignition controller for an internal combustion engine comprising automatic means dependent upon the vacuum in the intake pipe of said engine for controlling the time of the ignition, said automatic means being also adapted to open the ignition circuit when the engine is at rest.

10. An ignition controller comprising in combination with an ignition mechanism, of means for varying the timing of the ignition, said means being operable automatically in accordance with the speed of the engine to advance the ignition as the speed increases, said means being operable automatically to advance the ignition as less combustible is supplied to the engine and to relatively retard the ignition as more combustible is admitted to the engine, and a manually operated mechanism adapted to be set manually to further vary the time of ignition as determined by the aforesaid ignition advancing and retarding means.

11. An ignition controller for an internal combustion engine comprising in combination with an ignition mechanism of means for varying the timing of the ignition in accordance with the speed of the engine, and means for varying the timing of the ignition in accordance with the amount of combustible supplied thereto and also for rendering the ignition ineffective when th engine is at rest.

12. An ignition controller for internal combustion engines comprising an ignition timing means actuated by the vacuum set up by the flow of combustible mixture to the engine, and a manually operated means for varying the setting of the ignition timing as predetermined by the aforesaid vacuum means.

13. In an ignition controller, in combination, an ignition mechanism comprising a cam, a breaker lever, a pair of contacts, one being fixed and the other movable and carried by the breaker lever and means for lifting the breaker lever from the cam and the fixed contact when the engine is at rest.

14. In an ignition mechanism, a timer comprising, a revoluble cam, an adjustable plate, a breaker lever pivotally supported thereby and cooperating with the cam and contact, and means for lifting the breaker lever from the contacts when the adjustable plate assumes certain angular relations with respect to the cam.

15. In an ignition controller, a timer comprising a cam, a breaker lever adapted to open and break ignition contacts in the primary circuit, means for varying the relative angular positions of the breaker lever and cam depending upon engine operating conditions to thereby vary the time of ignition, and means for lifting the breaker lever from its cooperating contact to break the primary circuit when the breaker lever is set to a predetermined position.

16. In an ignition controller, in combination, an ignition mechanism for an internal combustion engine an automatically acting means for controlling the time of ignition in accordance with engine conditions, said means being adapted to advance the ignition upon increase of speed and to relatively retard the ignition upon an increase of load at the same speed, and automatically acting means for interrupting the current flow in the ignition circuit when the engine is at rest.

17. An ignition mechanism comprising a periodically actuated circuit breaker and cooperating contacts in the primary ignition circuit, an ignition timing means for controlling the time of action of said breaker, and means for elevating the breaker to cause the primary circuit to be interrupted under certain operating conditions.

18. In a spark control for internal combustion engines an ignition timing device movable to advance and retard the ignition, manually operable means for shifting the said ignition timing device, a vacuum actuated means connected with the intake of the engine, and means operated by the vacuum device for modifying the setting made by the said manually operable means upon the ignition device.

19. In an ignition controller for internal combustion engines, an ignition timing device movable to advance and retard the spark, and means for both manually and automatically moving the spark timing device to vary the timing of the ignition upon variation in load upon the engine and independently of any change in speed of the engine.

20. In an ignition controller for internal combustion engines, an ignition timing device movable to advance and retard the spark, means for both manually and automatically moving the spark timing device to vary the timing of the ignition upon variation in load upon the engine and independently of any change in speed of the engine, and an independent coacting means for varying the time of ignition in accordance with changes of speed of the engine.

21. In an ignition controller for internal combustion engines, a regulatable ignition timing device, manually operated means for controlling said ignition timing device and automatically operable means controlled by the pressure of the fluid within the intake manifold for modifying the timing of the ignition as controlled by said manually operable means.

22. In an ignition system for internal-combustion engines, the combination with an engine; of a current source; and provisions for ignition including an ignition timer arranged to be controlled manually and in accordance with the suction of the engine.

23. In an ignition system for internal-combustion engines, the combination with an engine; of a current source; and provisions for ignition including an ignition timer arranged to be controlled manually and in accordance with the speed and suction of the engine.

24. In an ignition system for internal-combustion engines, the combination with an engine; of a current source; and provisions for ignition including an ignition timer arranged to be controlled in accordance with the suction of the engine, and having manually operable means for selectively predetermining the range of timer control effected in accordance with the suction of the engine.

25. In an ignition system for internal-combustion engines, the combination with an engine; of a current source; and provisions for ignition including an ignition timer arranged to be controlled in accordance with the suction and the speed of the engine, and having manually operable means for selectively predetermining the range of timer control effected in accordance with the suction and the speed of the engine.

26. In a spark control for internal-combustion engines, a spark timing device movable to advance and retard the spark; and means for both manually and automatically moving said spark timing device to vary the timing of the spark upon variation in load upon the motor and in advance of any change in speed of the motor.

27. In an ignition system for internal-combustion engines, the combination with variable speed engines; of ignition provisions including a variable spark timer; a fluid actuated means for moving the timer in accordance with load and speed operating conditions; and manually operable means adapted for selectively predetermining the range of movement of the timer.

28. Ignition timing apparatus for internal combustion engines comprising, in combination, an engine driven shaft, a timer casing rotatable around said shaft, a plate rotatable in said casing and coaxial with said shaft, timer contacts connected with said plate, means for intermittently separating said contacts including a cam coaxial with the shaft and driven thereby, means for moving the casing, means for moving the plate with respect to the casing, and means for moving the cam with respect to the shaft.

29. Ignition timing apparatus for internal combustion engines comprising, in combination, an engine driven shaft, a timer casing rotatable around said shaft, a plate rotatable in said casing and coaxial with said shaft, timer contacts connected with said plate, means for intermittently separating said contacts including a cam coaxial with the shaft and driven thereby, means for moving the casing, engine load responsive means for moving the plate with respect to the casing, and engine speed responsive means for moving the cam with respect to the shaft.

30. Ignition timing apparatus for internal combustion engines comprising, in combination, an engine driven shaft, a timer casing rotatable around said shaft, a plate rotatable in said casing and coaxial with said shaft, timer contacts connected with said plate, means for intermittently separating said contacts including a cam coaxial with the shaft and driven thereby, manually operable means for moving the casing, engine load responsive means for moving the plate with respect to the casing, and engine speed responsive means for moving the cam with respect to the shaft.

31. Ignition timing apparatus for internal combustion engines comprising, in combination, an engine driven shaft, a timer casing rotatable around said shaft, a plate rotatable in said casing and coaxial with said shaft, timer contacts connected with said plate, means for intermittently separating said contacts including a cam coaxial with the shaft and driven thereby, means for moving the casing and means for moving the plate only with respect to the shaft, one of said means being manually operable and the other means being responsive to variations in engine load.

32. Ignition timing apparatus for internal combustion engines comprising, in combination, an engine driven shaft, a timer casing rotatable around said shaft, a plate rotatable in said casing and coaxial with said shaft, timer contacts connected with said plate, means for intermittently separating said contacts including a cam coaxial with the shaft and driven thereby, manually operable means for moving the casing, and means responsive to variations in engine load for moving the plate only with respect to the shaft.

Signed at Anderson, county of Madison and State of Indiana, this 5th day of January, 1915.

WILLIAM O. KENNINGTON.

Witnesses:
F. P. McDermott, Jr.,
Z. M. Smith.